(12) United States Patent
Jobson

(10) Patent No.: US 11,066,828 B1
(45) Date of Patent: Jul. 20, 2021

(54) MOLD DESIGN AND PROCESS FOR CONSTRUCTING AN INSULATED PRECAST CONCRETE WALL SYSTEM

(71) Applicant: Excel Realty Investors 100 LLC, Beachwood, OH (US)

(72) Inventor: Peter M. Jobson, Cleveland, OH (US)

(73) Assignee: Excel Realty Investors 100 LLC, Beachwood, OH (US)

( * ) Notice: Subject to any disclaimer, the term of this patent is extended or adjusted under 35 U.S.C. 154(b) by 0 days.

(21) Appl. No.: 16/740,955

(22) Filed: Jan. 13, 2020

(51) Int. Cl.
| | |
|---|---|
| *E04C 2/04* | (2006.01) |
| *E04B 2/64* | (2006.01) |
| *E04B 1/80* | (2006.01) |
| *E04B 1/14* | (2006.01) |
| *B32B 27/06* | (2006.01) |

(52) U.S. Cl.
CPC .............. *E04B 2/64* (2013.01); *B32B 27/065* (2013.01); *E04B 1/14* (2013.01); *E04B 1/80* (2013.01); *B32B 2307/304* (2013.01)

(58) Field of Classification Search
CPC .......... E04C 2/044; E04C 2/288; E04C 2/382; E04C 2/46; E04C 2/2885; E04B 1/04; E04B 1/165; E04B 2/68; E04B 2/84; E04B 2/64
See application file for complete search history.

(56) References Cited

U.S. PATENT DOCUMENTS

| | | | |
|---|---|---|---|
| 1,628,385 A * | 5/1927 | Bauer ...................... | E04G 13/04 249/50 |
| 2,634,601 A | 4/1953 | Tillery | |
| 3,435,581 A | 4/1969 | Ahlqvist | |
| 3,638,902 A | 2/1972 | Bergan | |
| 4,570,398 A | 2/1986 | Zimmerman | |
| 4,605,529 A | 8/1986 | Zimmerman | |
| 4,671,032 A | 6/1987 | Reynolds | |
| 4,685,264 A * | 8/1987 | Landis ...................... | E04B 5/40 249/28 |
| 4,751,803 A | 6/1988 | Zimmerman | |
| 4,934,121 A | 6/1990 | Zimmerman | |
| 4,942,707 A | 7/1990 | Huettemann | |
| 5,055,252 A | 10/1991 | Zimmerman | |
| 5,381,635 A | 1/1995 | Sanger | |
| 5,656,194 A | 8/1997 | Zimmerman | |

(Continued)

*Primary Examiner* — Brian E Glessner
*Assistant Examiner* — Daniel J Kenny
(74) *Attorney, Agent, or Firm* — George W. Moxon, II; Brian P. Harrod

(57) ABSTRACT

A wall structure comprising horizontal concrete base and top beams; two or more concrete vertical support members integrally joined to the base and top beams and meeting at an essentially right angle; wherein the two or more vertical support members define left and right wall boundaries, and wherein the top and base beams define top and a bottom wall boundaries, respectively; an exterior wall shell extending from the left to the right wall boundaries, and extending from the top to the bottom wall boundaries, and continuous with the base and top beams, and the support members; H-shaped insulation encompassing the vertical support members, attachment strips attached to the insulation along its length with fasteners joining the attachment strip to the vertical support member, wherein the fasteners pass though the insulation; and insulation attached to the exterior wall shell between the vertical support members.

6 Claims, 10 Drawing Sheets

(56) References Cited

U.S. PATENT DOCUMENTS

| | | | | |
|---|---|---|---|---|
| 5,865,001 | A | 2/1999 | Martin et al. | |
| 5,956,911 | A * | 9/1999 | Kistner | E04C 2/044 |
| | | | | 52/302.3 |
| 6,003,276 | A | 12/1999 | Hegemier et al. | |
| 6,003,278 | A | 12/1999 | Weaver et al. | |
| 6,125,608 | A * | 10/2000 | Charlson | E04B 1/7604 |
| | | | | 52/404.1 |
| 6,151,843 | A | 11/2000 | Weaver et al. | |
| 6,260,320 | B1 * | 7/2001 | Di Lorenzo | E04B 1/04 |
| | | | | 52/250 |
| 6,279,285 | B1 | 8/2001 | Kubica | |
| 6,280,669 | B2 | 8/2001 | Kister et al. | |
| 6,349,520 | B2 | 2/2002 | Kubica | |
| 6,427,406 | B1 | 8/2002 | Weaver et al. | |
| 6,438,917 | B2 | 8/2002 | Kubica | |
| 6,463,702 | B1 | 10/2002 | Weaver et al. | |
| 6,494,004 | B1 | 12/2002 | Zimmerman | |
| 7,365,999 | B2 | 4/2008 | Walpole | |
| 7,530,203 | B1 | 5/2009 | Hare et al. | |
| 7,627,997 | B2 * | 12/2009 | Messenger | E02D 27/02 |
| | | | | 52/309.17 |
| 7,736,048 | B2 | 6/2010 | Zimmerman et al. | |
| 7,922,145 | B2 | 4/2011 | Martin | |
| 7,980,843 | B2 | 7/2011 | Zimmerman et al. | |
| 8,176,696 | B2 | 5/2012 | Leblang | |
| 8,186,906 | B2 | 5/2012 | Zimmerman | |
| 8,375,677 | B1 * | 2/2013 | Weiler | E04B 1/0007 |
| | | | | 52/745.1 |
| 8,513,559 | B2 | 8/2013 | Brandstrom | |
| 8,997,436 | B2 | 4/2015 | Spear | |
| 9,797,136 | B2 | 10/2017 | Gentry et al. | |
| 9,856,639 | B2 * | 1/2018 | Koszo | E04B 1/167 |
| 10,119,271 | B2 * | 11/2018 | Franck | E04B 2/26 |
| 2001/0000843 | A1 | 5/2001 | Kubica | |
| 2001/0000844 | A1 | 5/2001 | Kubica | |
| 2001/0001514 | A1 * | 5/2001 | Kistner | E04C 2/044 |
| | | | | 264/276 |
| 2019/0323235 | A1 * | 10/2019 | Benson | E04B 5/19 |

\* cited by examiner

MOLD DESIGN AND PROCESS FOR CONSTRUCTING AN INSULATED PRECAST CONCRETE WALL SYSTEM

BACKGROUND OF THE INVENTION

The present invention is directed to improvements in the construction of concrete walls and wall systems such as basement walls comprising a complete foundation system utilizing pre-formed concrete wall panels.

Pre-cast concrete walls have been used in construction for several decades and are an alternative method of constructing concrete walls for basements or buildings as compared to traditional methods of pouring them in place, or building up walls using concrete blocks and mortar. Pre-cast walls have the advantage of being precise in their manufacture, can incorporate insulation into their design, and can be manufactured quickly and efficiently in a controlled factory environment.

However, previous mold designs for such systems, have relied upon various components such as metal channels to hold separate pieces of insulation in place, integration of pre-existing concrete components, cumbersome metal formwork, and also lack specific corner design to enable finishing materials to be firmly hung in interior building corners, resulting in the necessity of adding additional structural elements in the corners to affix finishing materials such as wallboard. Until now, there has been no design whereby insulation pieces used in the mold have been specifically cut to size and shape without reliance on concrete or metal elements, to furnish the precise mold necessary to shape the concrete wall with insulation conforming to code, nor have previous mold designs offered a specific design to incorporate the joining together of two walls into a 90-degree structural corner with interior wall studs or structures to enable support of finishing material in each interior corner.

As contrasted with traditional poured-in-place foundation walls, pre-cast concrete walls are formed in a factory as a series of wall panels, typically six to fourteen feet long and then transported to a building site where the wall panels are fitted together using threaded steel rod and locking nuts to join abutting walls together, with joints sealed, and thereby a unified building foundation is created.

Pre-cast concrete walls offer the advantages of precise installation and aesthetic attractiveness. Their cost efficiencies, as well as ease and speed of construction and maintenance, together with improvements in the insulating and energy efficiency (compared with other methods) have also contributed to increased usage of pre-cast concrete construction in place of more traditional methods.

Examples of pre-formed wall structures are found in Ahlqvist U.S. Pat. No. 3,435,581; Reynolds U.S. Pat. No. 4,671,032; Zimmerman U.S. Pat. Nos. 5,055,252; 4,570,398; 4,605,529; 4,751,803; and 4,934,121. Tillery U.S. Pat. No. 2,634,601 discloses an insulated building wall construction.

However, pre-cast concrete walls such as those disclosed in the above patents have continued to suffer deficiencies in: 1) the ability to pour a concrete wall system using solely self-supporting insulation to form the mold for the walls without resort to other structural elements to hold the insulation in place. 2) their ability to meet the building code in terms of overall required R-Value for a residential basement and the ability of the type of insulation on the interior "finish" side of the basement to meet the building code's thermal requirements in terms of controlling smoke development and flame spread. 3) their ability to accommodate interior finish materials, particularly in the interior corners. Pre-cast wall systems have to date not enabled placement of interior fastening surfaces adjacent and at 90-degrees (perpendicular) from one another in each corner which enables fastening of finish material. Wall system designs to date have left only open corner areas where additional structural support must be added in order to attach wallboard in the corner. 4) their capacity for forming mitered 45-degree concrete corner walls whose angled concrete faces fit together to form 90-degree angles, such angle allowing for a 90-degree change in the direction of a foundation and necessary, for example, to form a rectangular basement foundation, and which corner is composed of structural concrete.

SUMMARY OF THE INVENTION

The present invention relates to a wall structure comprising a concrete base beam located in an essentially horizontal plane; a concrete top beam, located in an essentially horizontal plane; two or more concrete vertical support members integrally joined to the base beam and the top beam and meeting said beams at an essentially right angle; wherein said two or more vertical support members have leftmost and rightmost members that define a left wall boundary and a right wall boundary, respectively, and wherein said top beam and said base beam define a top wall boundary and a bottom wall boundary, respectively; an exterior wall shell extending from said left wall boundary to said right wall boundary, and extending from said top wall boundary to said bottom wall boundary, and continuous with said base beam, said top beam, and said support members; H-shaped insulation encompassing and attached to said vertical support members, attachment strips attached to said insulation running along its length and having one or more fasteners joining the attachment strip to the vertical support member, wherein said fastener passes though said insulation; and rigid insulation attached to the exterior wall shell and positioned between said vertical support members.

The present invention further includes a method of constructing a prefabricated wall structure comprising orienting interspaced stud molds having an H-shaped channel shape cross section configurations and edges defining an open portion of the channel shape, in a horizontal configuration within a framing means having a top, bottom, and sides and providing containing walls of the mold such that the edges of the stud molds form uppermost parts of the stud molds and are located within an essentially horizontal plane within the framing means; said stud molds being spaced equally between the top and bottom framing means and having a length of less than the length between the top and bottom framing means to thereby create a space above and below, wherein said stud molds and framing means create cavities that in fluid communication with one another; positioning rigid insulation panels within the framing means, between the edges of the stud molds, but not covering the open portions of the channel shapes of the stud molds, to form a continuous surface within the framing means; pouring concrete into an enclosure formed by the framing means, stud molds, support members and rigid insulation panels so as to cover the rigid insulation panels and to fill the stud molds and the support members thereby forming the prefabricated wall structure. permitting the poured concrete to set; and removing the wall structure from the framing means, stud molds and support members.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
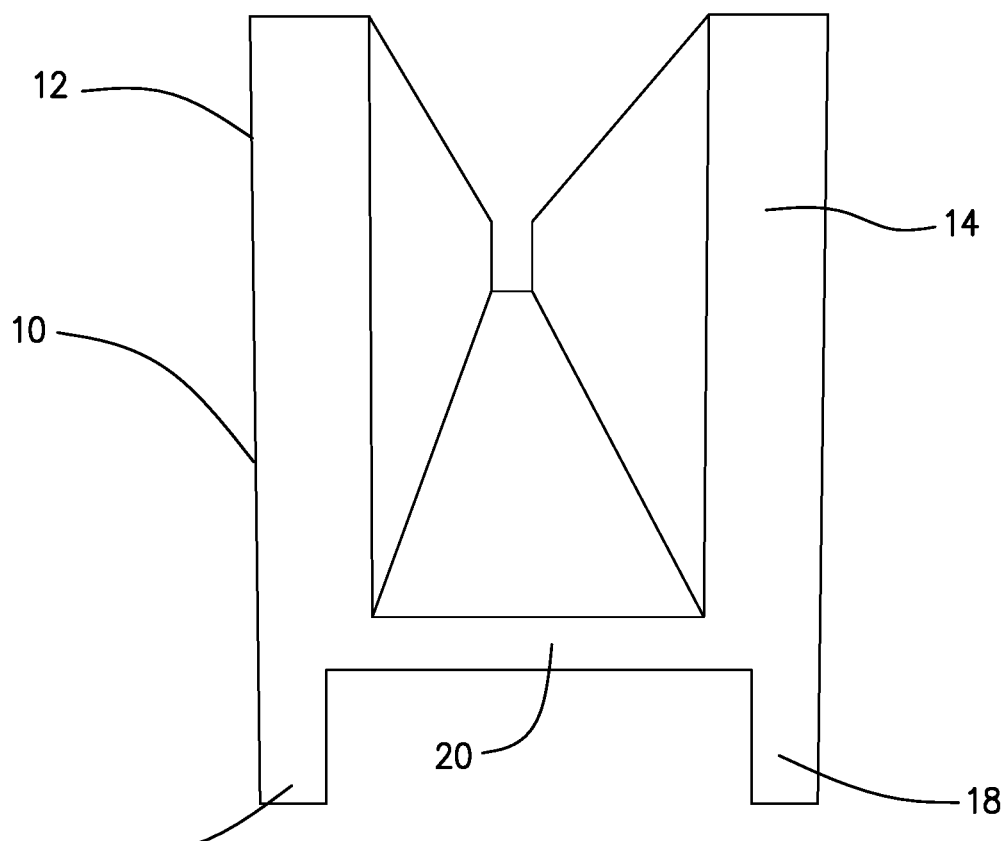
FIG. 1 is a perspective view of an "H" piece employed in the improved molding process.

The present invention is directed to improvements in the construction of concrete walls and wall systems such as basement walls comprising a complete foundation system utilizing pre-formed panels. Concrete is poured into wall molds in a flat, horizontal orientation. The poured concrete is allowed to set/cure to form uniform, continuous, monolithic wall segments. Once cured, the molds are removed and the solid, concrete walls are rotated 90° to a vertical, up-right orientation, ready to be combined and assembled into a foundation.

The insulation mold design of the present invention consists of insulation pieces which, when arranged in a specific pattern horizontally on a concrete pouring table, and bounded by side rails forming a rectangle, comprise the form that dictates the shape of a pre-fabricated concrete wall which, together with the insulation pieces that remain in the finished product, enable a finished product that meets the requirements of the building code for pre-cast walls. More specifically, the design of the present invention will expose a code conforming extruded polystyrene (XPS) insulation piece to a building's interior.

The design of the present invention remedies the shortcomings of prior systems as detailed above by specifically enabling and allowing for: 1) the concrete for each wall panel to be poured into a form made substantially of insulation pieces, which minimize or eliminate the need or use of metal channels, metal forms, or previously cast concrete, and a concrete wall panel to be fully and completely formed solely with a mold made of specifically designed insulation pieces, which wall panels also incorporates furring strips (most commonly metal "hat channel" or wood) to enable finished material (typically drywall) to cover the walls after they are set and assembled on a construction site and 2) the interior exposure of the finished wall system to be XPS insulation. XPS insulation differs from other types of insulation, including expanded polystyrene (EPS) insulation, because it meets the requirements of the building code in terms of retarding flame spread and smoke development. 3) the placement and incorporation of adjacent interior vertical concrete studs set with stud faces at 90-degrees (perpendicular) to one another, which allows finished material to be firmly fastened to wall surfaces in interior corners, and 4) two walls to be set together with 45-degree mitered matching angles which combine to form a 90-degree corner, enabling the foundation to turn 90-degrees.

In the preferred embodiment of the invention the walls will be 9 feet 4 inches high, although other heights are achievable, and the pre-cast walls are typically 6-14 feet in length.

The present invention employs a long, rigid, generally "H"-shaped piece of insulation. Other materials can be used, such as a metal, wood, plastic, concrete and others, but insulation is preferred. Its cross-sectional geometric design allows it to be entirely self-supporting as an element of formwork. The uniqueness of the H shape derives from its creation of two separate cavities, above and below the H's horizontal cross-piece, each enabling a different element of the finished concrete wall product to be created. The bottom cavity of the H is the smaller of the two cavities. It functions primarilty to hold material in place for interior finishing. The upper cavity serves as a mold for forming concrete studs that integrate with the outer shell 50 or finished walls and top and bottom beams of the wall panel. The preferred dimensions are 4 inch wide upper cavity and a 1 ine wide lower cavity.

Figure 6:
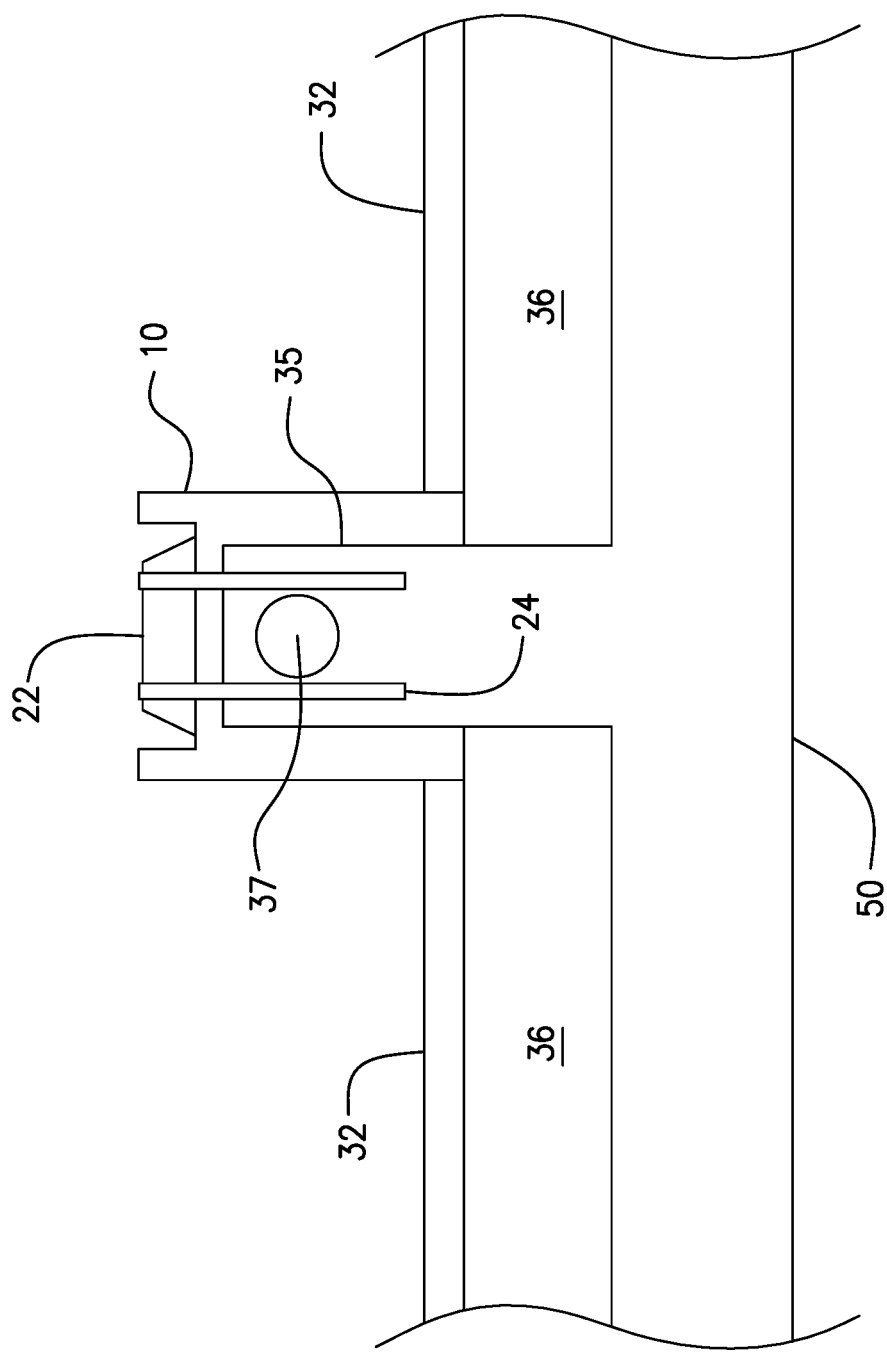
FIG. 6 is a cross-sectional top down view of a portion of a finished wall.
Figure 10:
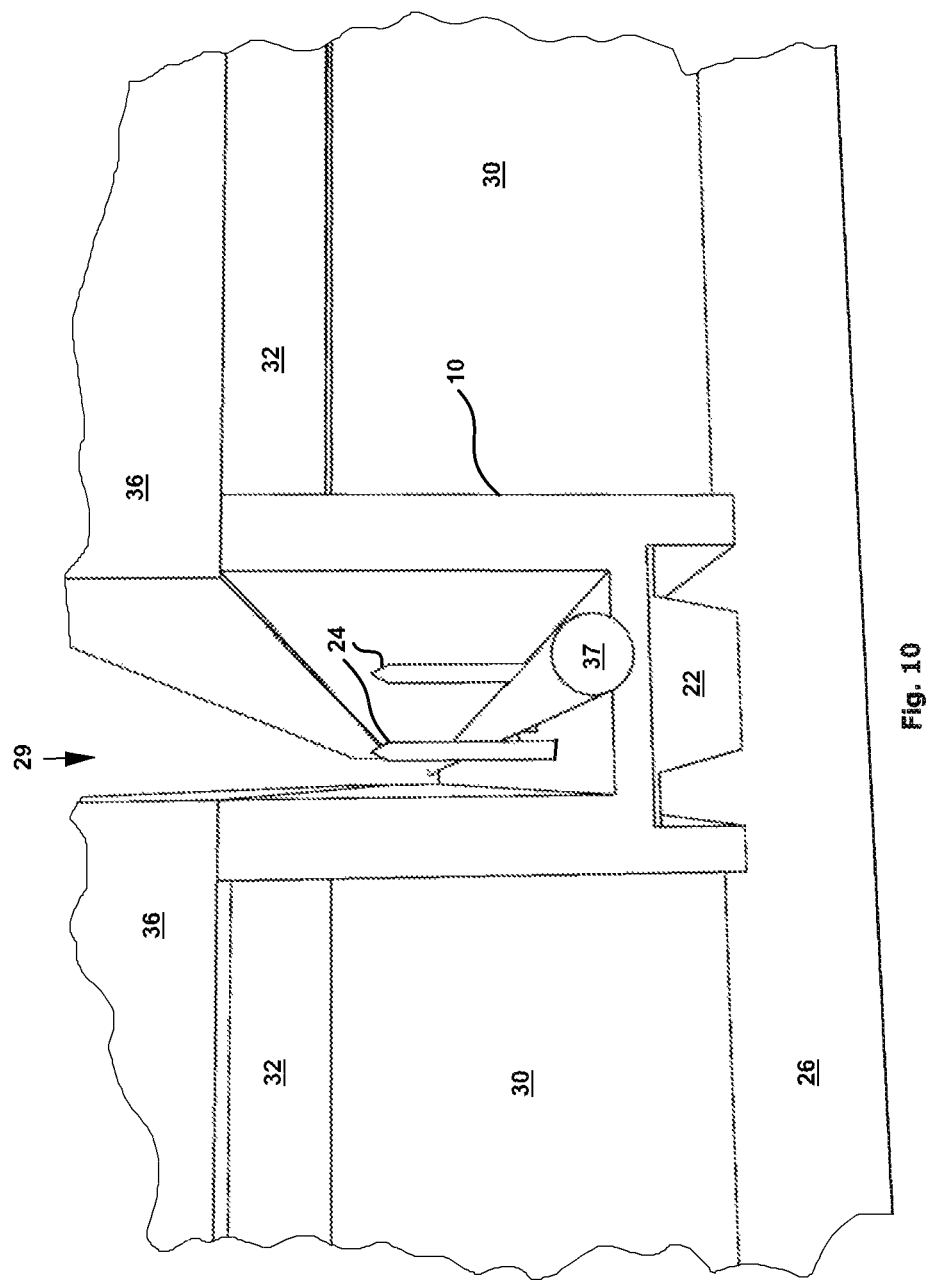
FIG. 10 is a perspective close up view of the H-piece of FIG. 2.

By generally H-shaped, the term includes other cross-sectional shapes could be used or formed, such as pairs of back-to-back U-shapes (one facing up, one facing down, or other shapes that create a composite H-shape), so long as the shape creates upward and downward openings or cavities as the H-shape does; however, H-shaped is preferred. The underside of the H-shaped piece allows for a furring strip to be inserted within the legs of the H and in turn the furring strip simultaneously connects to the concrete wall studs by the inclusion of metal screws or pins or appropriate fasteners that pass through the H's horizontal cross-piece and into its upper cavity, and ultimately, into the concrete stud. This is illustrated in FIGS. 6 and 10.

The open upper cavity of the H-shaped piece, defined by the upper legs, serves as a mold for creating a stud since it allows for concrete to flow into the cavity and form the studs that bear the building loads (as well as fix the furring strips in place). Further, the use of the H-shaped piece enables the creation of a pre-cast concrete wall that meets the requirement for such walls as outlined in the 2018 IRC building code ("building code") in terms of structural strength and weight bearing capacity. The shape of the stud is not critical. The preferred shape is rectangular, but other shapes are possible. The H-shaped piece runs vertically almost the entire height of the finished, erected wall panel, and integrates/joins with both the horizontally running top and bottom beams of the wall panel to integrate the entire rectangular structure of the wall. So the length of the H-piece will be less than the height of the finished panel to allow for the space to create the top and bottom beams. The H-shaped pieces can be set closer together to create a wall that is structurally stronger due to the increased number of weight bearing studs created, or further apart if less structural strength is needed. The number of studs created will depend on the width of the wall panel. So, there could be as few as 3, or as many as 8 or more.

Rectangular blocks of insulation are interspersed between the H-shaped pieces to maintain such specific distances when assembled horizontally on the platform in preparation for a concrete pour. The heights of the tops of the H-shaped pieces and rectangular interspersed support blocks are set one inch apart (with the support block being one inch lower than the H), so that when the one inch thick piece of XPS insulation is placed on top of the support block, the two insulation pieces together match the thickness of the H piece. (about 5 inches thick). This then allows a wider three inch high piece of EPS foam insulation to be placed over both the XPS foam piece and the outer edges of the H piece, leaving exposed the upper cavity of the H piece. The entirety of the insulation assembly is 8 inches thick, which allows (when the concrete is poured into the mold) a two inch outer concrete covering to form above the insulation pieces and flow into the upper cavity of the H piece, the vertical limit of such concrete covering being 10 inches due to the 10 inch side rails which bound the outer edges of the rectangular wall form. The two inch concrete outer covering acts as an exterior "shell" wall that is integrated with each wall's concrete studs and top and bottom beams and unifies the wall. Therefore, when panels are poured on a horizontal table they are 10 inches high. Then, when each panel is raised vertically, as previously discussed, the 2 inch concrete covering which was poured to fill and cover the insulation pieces becomes the outer concrete shell of the wall panel. The (interior) insides of the panels are comprised of: 1) the insulation interspersed between the H-shaped pieces and 2) the furring strips at the bottom of the H-shaped pieces enabling placement of finishing material, and 3) the concrete studs themselves which are covered by the insulation mold remaining in the finished product. Furthermore, the insulation mold system enables layering of the pieces interspersed between the H pieces which in turn allows specific insulation (XPS) to become the interior finish of the wall. The insulation remaining as part of the finished product can be varied to create a variety of R-values (thermal values) depending on the thickness of said insulation. In addition, the final interior XPS insulation layer meets building code in terms of retardation of smoke development and flame spread.

The insulation forms used in combination comprise a flexible system for creating a mold, which can in turn dictate the shape, strength, height and width of a wall panel, and entire wall system. Stud size is based upon H-shape opening. In addition, the repetitive nature of the insulation set up and relatively minimal time it takes to pour an entire basement system in a factory emerge as a competitive advantage when contrasted with the uniquely custom job of pouring a foundation on a building site, with varying soil conditions, topography and inclement weather. Workers can be more easily trained in the system, and work can proceed regardless of the outside environment.

Figure 2:
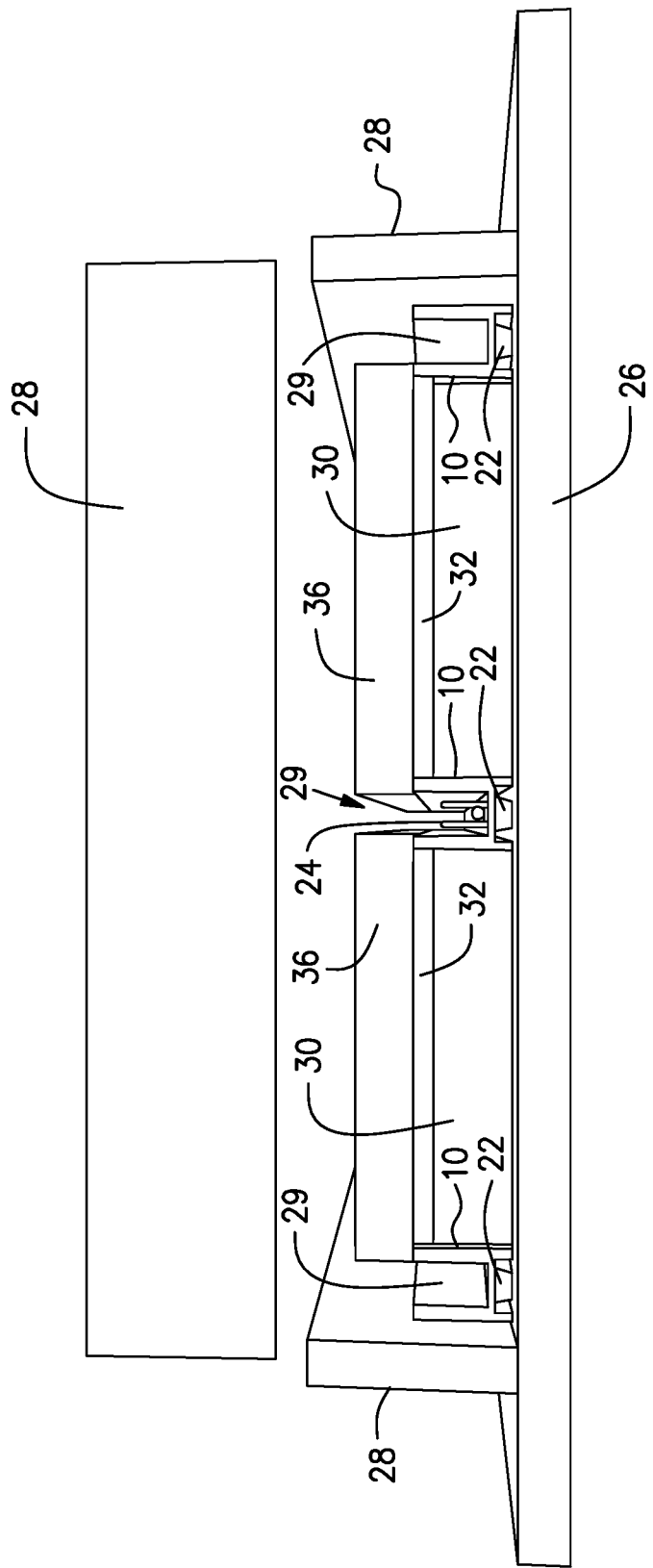
FIG. 2 is a front perspective view of the mold assembly form employing the "H" piece of the present invention.

As can be seen in FIGS. 1 and 2, the detailed design of the "H" shaped piece of insulation 10, which has two vertical legs 12 and 14, two lower legs 16 and 18, and perpendicular cross-piece 20 which joins the legs into a unitary "H" shape. The upper legs 12, 14 join with the cross-piece 20 to define an upward "U", while the lower legs 16, 18 join with the cross-piece 20 to define a downward "U" or underside. When H-shaped insulation 10 is assembled together with the other components identified herein into a unified mold, it enables the creation, with a single pour of concrete, of a pre-cast concrete wall that meets the requirement for such walls as outlined in the 2018 IRC building code ("building code").

The H-shaped piece, preferably, is made entirely of insulation and its geometric design allows it to be entirely self-supporting. The underside of the "H" allows for a furring strip (also referred to as an attachment strip) 22 (shown in FIG. 2) to be inset within the "H" that is of identical length as the "H". In the preferred embodiment of the invention, this common length is 8 feet 8 inches. The furring strip is connected to the "H" shaped piece and the furring strip simultaneously connects to the concrete wall stud by the inclusion of metal screws or pins 24 (see FIGS. 2, 10) which are drilled through the side flanges of the furring strip and upward through the cross piece of the H shaped insulation and into the upper cavity of the "H" above into which concrete will be poured. Using this design, the furring strips at the bottom of the "H" are held tightly in place by the screws or pins cast into the concrete stud.

During the formation of the panel, the H-shaped insulation pieces are laid horizontally with the lower cavity oriented downward and the upper cavity oriented upward. The H insulation pieces are set on a platform 26 and spaced at intervals of 16 inches, 24 inches, or 32 inches as necessary (24 inches in the preferred embodiment of the invention), depending on the building weight the precast walls are designed to carry. The closer the spacing of the concrete studs, the greater the building weight the wall panel can carry. Steel rebar is set within the upper cavities of the H-pieces to reinforce the concrete stud. This design enables creation of concrete studs when the panels are poured by allowing concrete to flow into the upper section of the H-shaped insulation mold. Rectangular pieces of insulation are interspersed between the H-shaped pieces and designed to match the vertical elevation of the H-shaped piece. Using this design the flowing concrete fills the H cavities creating reinforced structural members (studs) while a two inch continuous concrete shell (outer surface) 50 is formed above the top of the H cavities and interspersed rectangular blocks.

Figure 5:
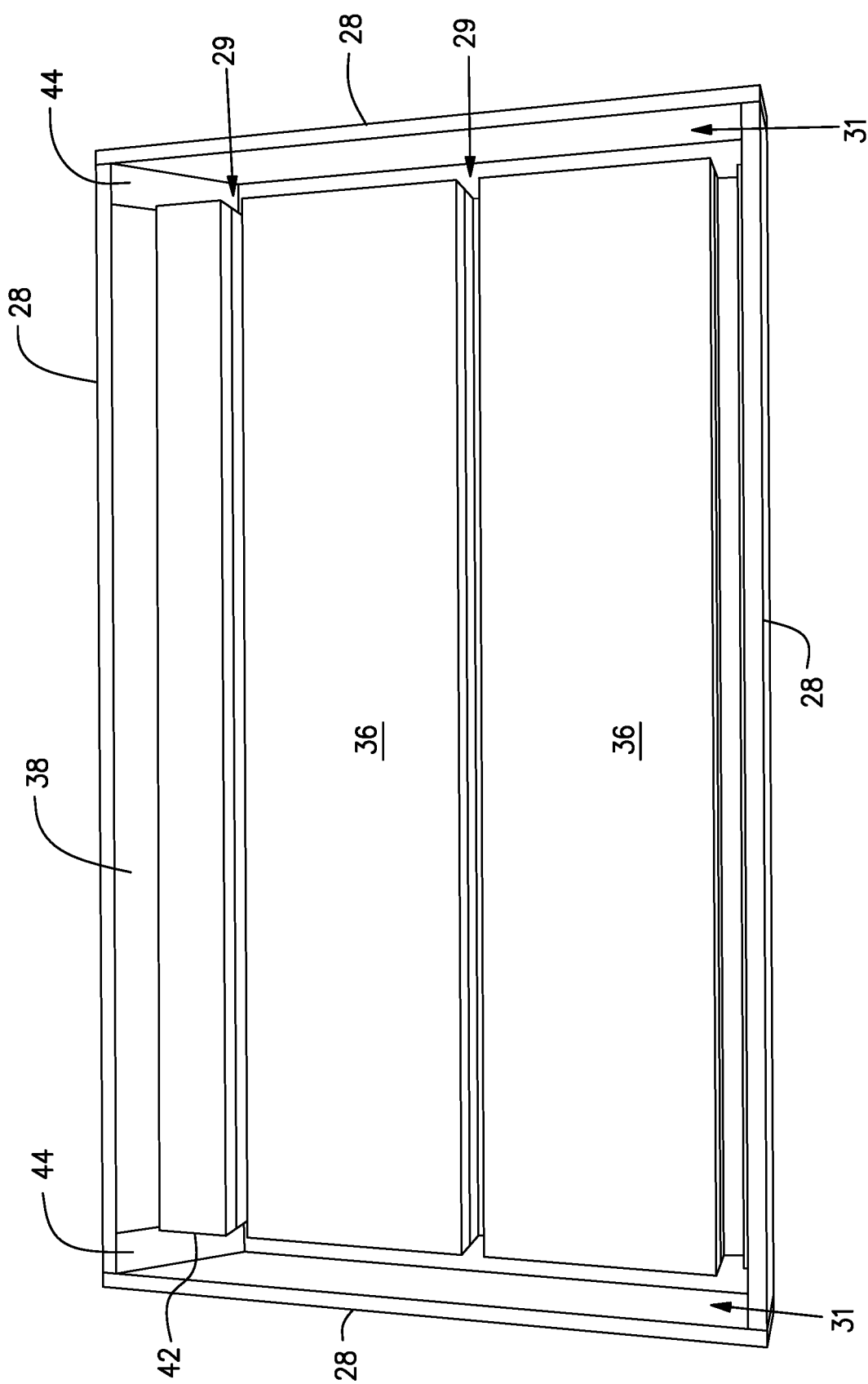
FIG. 5 is a top down perspective of a corner assembly bounded by side rails showing placement of the pieces necessary to mold a wall corner.

Four moveable side rails 28 are set next to the outside surface of end H-pieces (the edges of the wall insulation mold) as well as at the front and back ends (top and bottom of the wall insulation mold, with the front one shown in FIG. 2 and all four shown in FIG. 5) to create the outer boundaries and limits of the concrete wall product. In the preferred embodiment of the invention, these side rails bounding the insulation set up are 10 inches high, which results in finished walls, when erected vertically and set into place, having a depth of 10 inches. Prior to the concrete pour, the appropriate combination of the insulation pieces are fit precisely into place, within the bounds of the 10 inch high side rails, to create the wall mold which, in turn, creates the form of the precast concrete wall.

As seen in FIG. 2, a block of foam insulation 30 which is rectangular in shape and, preferably, 4 inches high by 20.5 inches wide and identical in length to the "H" piece at 8 feet 8 inches, is placed on platform 26. Its height is set 1 inch lower than the height of the adjacent "H" piece to allow a 1 inch thick panel of XPS 32 insulation to be set on top of said insulation block to equal the height of the H. The insulation block 30 has a purpose of keeping the "H" pieces of insulation in place and prevent them from moving during the concrete pour when lateral forces occur that might potentially disrupt the insulation form, as well as serve as underpinning and support for the two insulation pieces (one XPS and one EPS) which rest on the top of this rectangular block, and which remain in the finished product when complete. The large rectangular block of EPS foam insulation 30 is not instrumental in determining the ultimate shape of the finished wall product. In the preferred embodiment of the invention it is made from EPS foam insulation and sized with sufficient room to be easily pulled out from the finished wall panel and re-used in future mold assemblies. The underlying EPS foam insulation piece 30 is removed from the finished product once the pre-cast concrete has hardened and the product is complete.

As seen in FIG. 2, the 1-inch thick piece of XPS insulation 32 rests on top of the support block of EPS insulation 30. XPS insulation piece 32 is glued to EPS foam insulation piece 36 so that it remains a part of the finished product when piece 30 is removed from the wall panel. The purpose of the XPS insulation is to meet the building code requirements for flame spread and smoke development. Layering the XPS piece 32 above the support piece of EPS 30 insulation allows the XPS to remain in the finished product as the piece of insulation exposed to the interior of the foundation at completion. Exposure of the XPS foam insulation piece as the finished face of the product enables the pre-cast wall to meet the requirements of the building code in terms of the above identified requirements, whereas EPS foam insulation does not. This inset piece of XPS insulation 32 may vary in thickness but in the preferred embodiment of the invention it is 1 inch thick. It is also rectangular in shape and matches the H-piece and underlying support block of insulation upon which it rests in length, 8 feet 8 inches, and matches the underlying support block in width at 20.25 inches. This piece of XPS insulation 32 remains in the pre-cast concrete wall when the product is complete.

FIG. 2 also shows another piece of EPS foam insulation 36 which is designed as wider, preferably 1.5 inches wider, than the underlying rectangles of XPS 32 and support EPS insulation 30 described previously: so that the additional 1.5 inches of width may cover the vertical sides of each of the 2 adjoining "H" pieces which are each 0.75 inches thick. FIG. 2 shows the top piece 36 (or "A-piece") of insulation on top of and covering the vertical sides of the "H". EPS foam insulation 36 matches the "H" piece and other pieces of insulation in length at 8 feet 8 inches and is 3 inches high, and 22 inches wide. The EPS foam insulation 36 with 3 inch thickness in the preferred embodiment of the invention, together with the XPS insulation 32 both remain in the finished product and provide the overall thermal R-value for the foundation system which meets building code.

As seen in FIGS. 2 and 5, the assembly and arrangement the H-piece together with enclosing front rails 28 and an enclosing back rail (not shown, but which is identical to the front rail 28), in concert with the pieces of insulation, 32, and 36 (which will become part of the wall structure), and support piece 30, enable a precast concrete wall to be poured into the enclosure formed by the front 28, back 28 and side rails 28, and on top of the platform 26, which is precise in its geometry and designed to function as a basement foundation wall, e.g. for a residential building or be used above ground as an enclosing wall for a building. The open upper cavities 29 of the H-shaped piece 10 in FIGS. 2, 3, 4 and 5 allow for concrete to flow into them and form the studs necessary to bear building loads. Concrete will flow in to mold and cover insulation pieces 36, forming a uniform, flat concrete sheet, which, when cured, will be the out shell wall 50 (See FIGS. 6 and 9) of the finished wall panel section.

Figure 7:
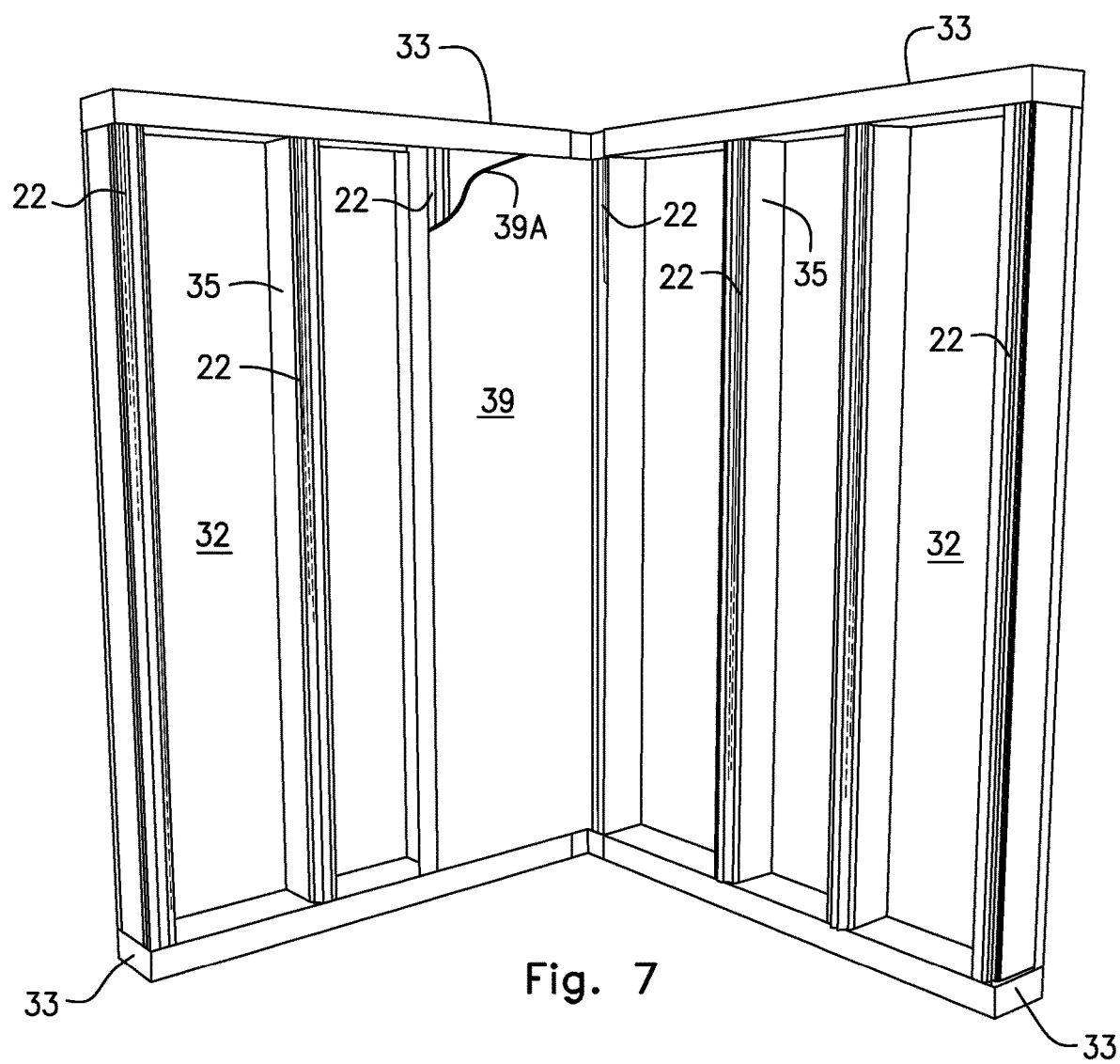
FIG. 7 is a perspective view of two wall corners fitted together to form a foundation corner at a 90-degree angle.
Figure 8:
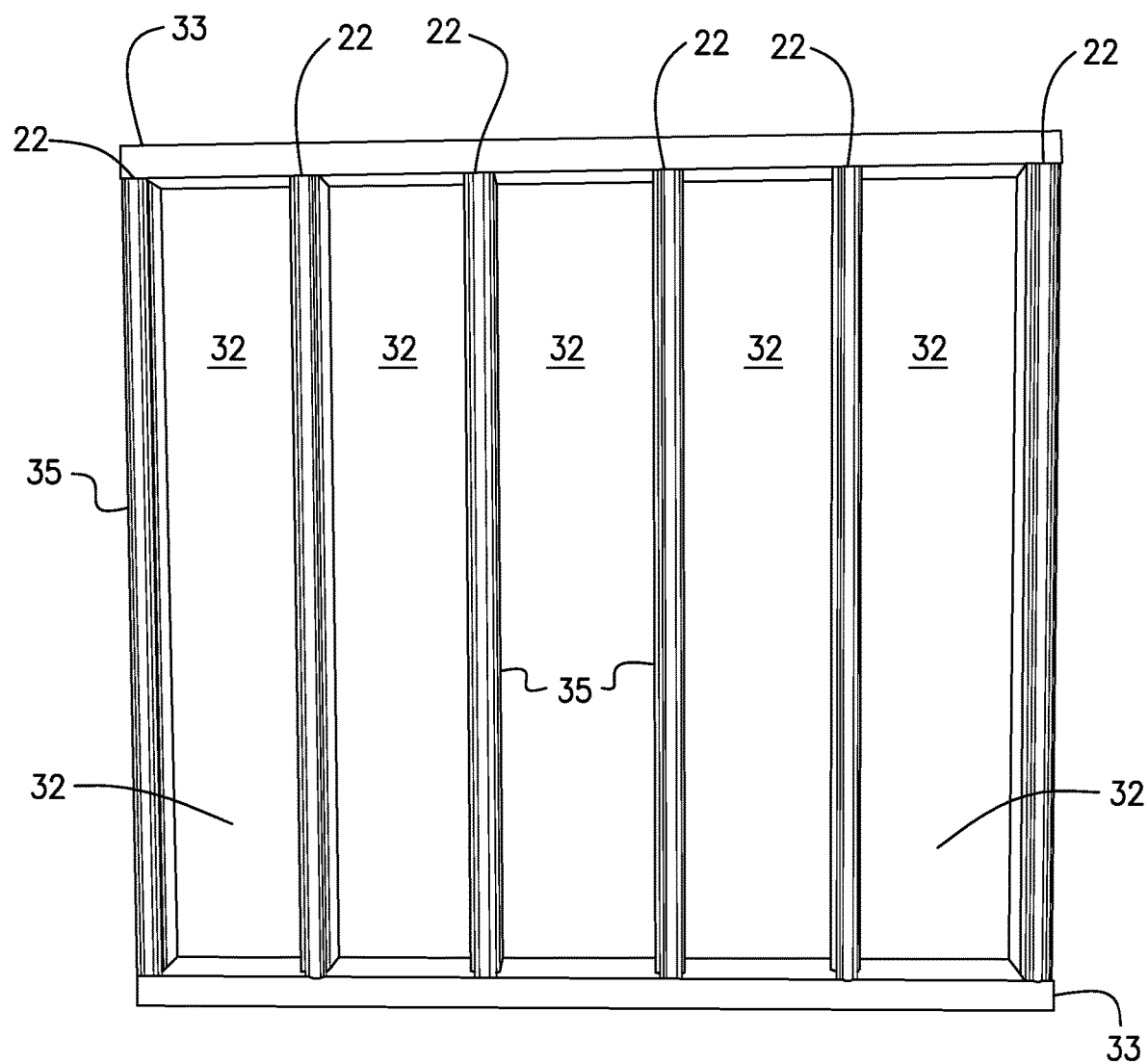
FIG. 8 is a perspective view of a straight wall panel in finished form.

As noted, the front, side and rear rails bound the rectangular form. Concrete is poured within the enclosed rectangular form up to the top of the 10 inch rail height. This creates a 2-inch outer shell 50 poured uniformly with and integrated with the 6.75-inch-long by 2-inch-wide rebar reinforced concrete studs which form the structural wall. Additionally, beams (4 inches in the preferred embodiment of the invention) are created by allowing cavities 31 in FIG. 5 at the top and bottom of each wall. These cavities 31 will fill with concrete to form the top and bottom beams 33 (See. FIGS. 7, 8) The self-supporting H piece of insulation, which is 8' 8" long, allows furring strips 22 to be inset below the H-piece and cast into the concrete, enabling finish material, such as drywall, to be hung on wall (attached to furring support strips 22) after they are assembled into a basement. Insulation piece 10 and 32 also remain in the finished wall and allow a code required R-value for the basement. Four-inch-thick concrete top and bottom beams 33, (formed in cavities 31) reinforced with rebar, in FIGS. 6,7,8 create an integrated footing for the wall and top surface to which a wood sill plate is attached. Appropriate supports or chairs for the rebar can be employed to assure the proper spacing and support for the rebar. Masa clips, or other fasteners known in the art, can be cast into the concrete wall for use in attaching the sill plate. Walls are manufactured to precise dimensions and joined on-site to form a complete basement foundation. The design is enabled by the self-supporting H piece of insulation 10 making the wall assembly composed entirely out of insulation and without necessitating other structural components to support the insulation pieces. Insulation pieces can be repeated and side rails moved to create walls of varying length. Height can also be varied by increasing or decreasing the length of the pieces making up the form. The result is a unique and flexible system to manufacture basement wall panels to be connected into a single basement foundation.

Figure 3:
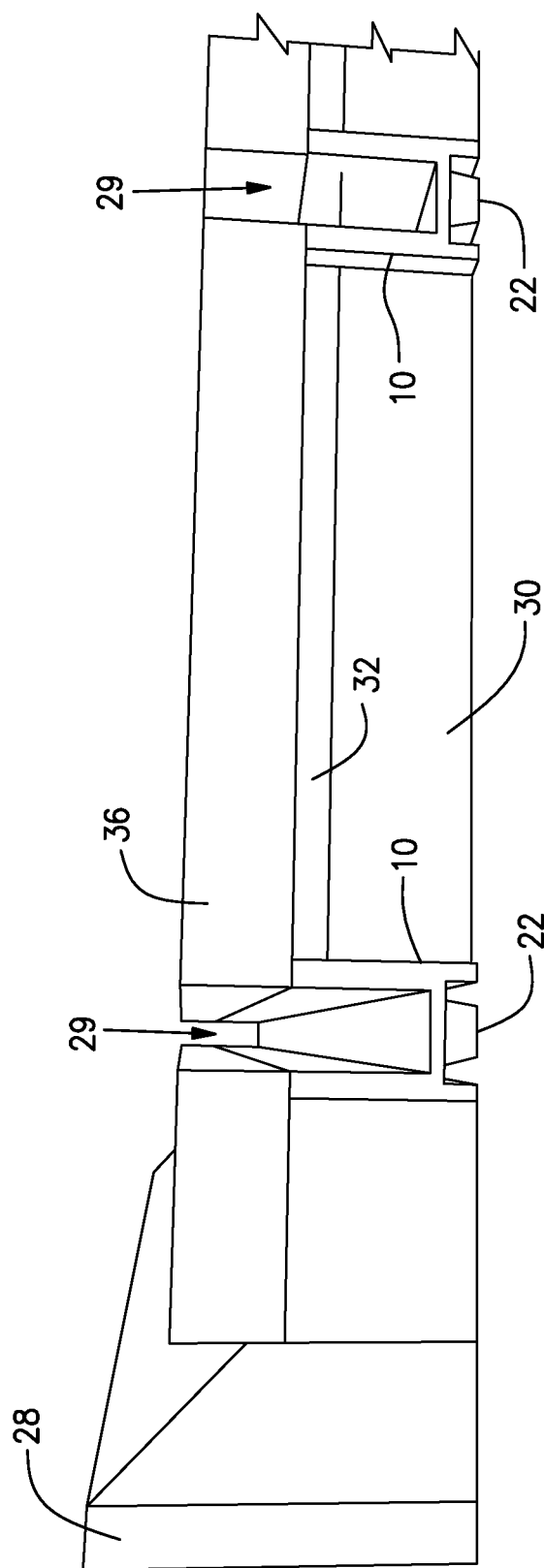
FIGS. 3 and 4 are perspective views of the mold assemblies employed to make a corner wall.
Figure 4:
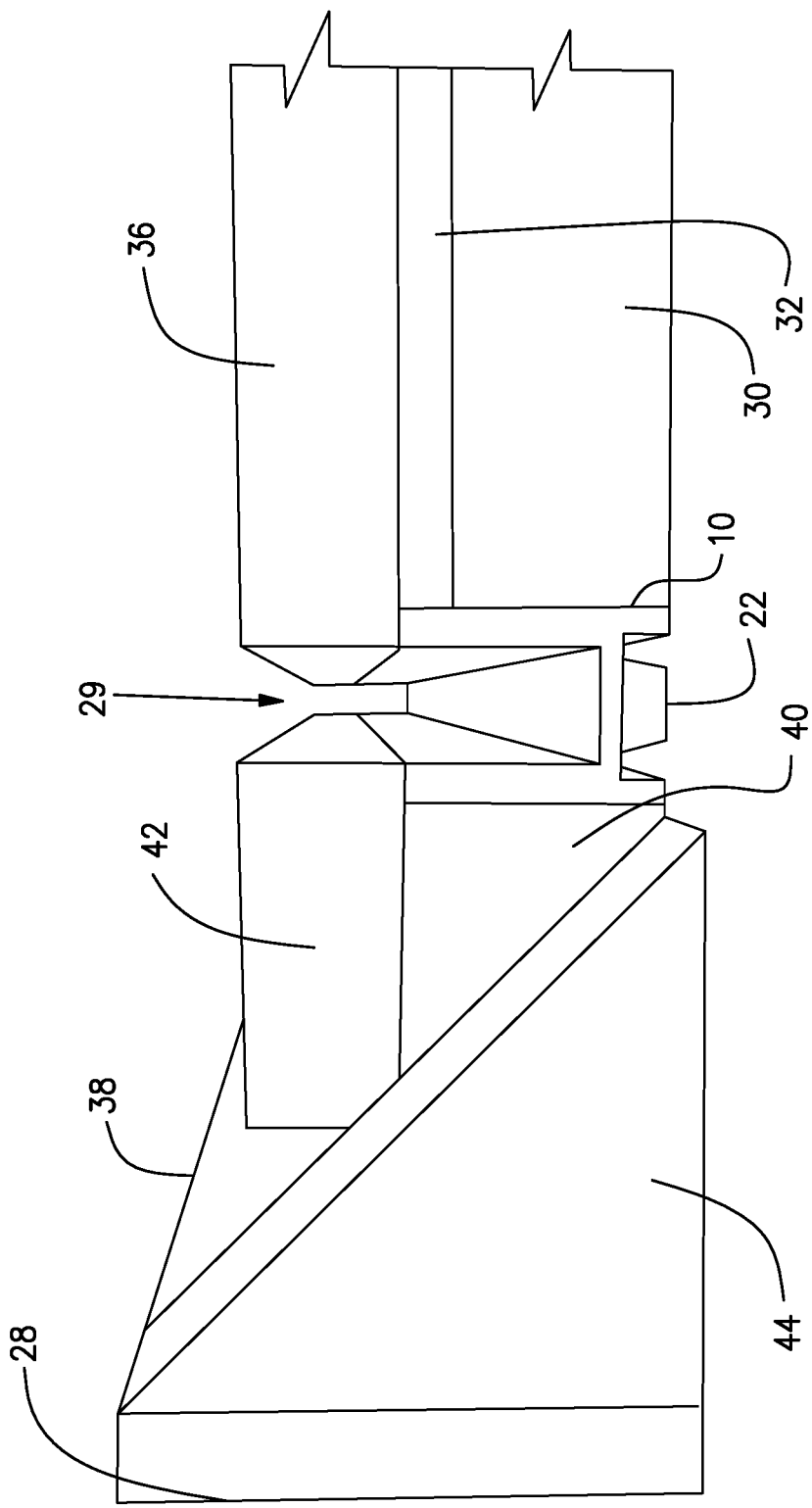

In addition to straight self-contained concrete wall panels, the present invention also enables a system for allowing concrete wall panels to be joined to form 90 degree mitered corners. Basement foundations and above ground enclosing wall systems are typically rectangular in shape and require a design to form 90-degree corners. As can be seen in FIGS. 3 and 4, three pieces of insulation 38, 40, and 42 when placed adjacent to one another in a specific pattern together against a bounding side rail 28, enable a creation of a 45-degree wall corner. Piece 38 is a trapezoid which creates the 45 degree angle necessary for a particular wall to fit together with a perpendicularly adjoining wall with a matching 45 degree angle. Piece 40 is a support piece which is removed from the finished wall after concrete cures and whose function is to support Piece 42 which extends over the edge of the H piece to the edge of the H's upper cavity to help form the concrete stud adjacent to the corner, and to form the edge of the 45 degree concrete corner at the opposite side. Piece 42 stays in the finished wall product at completion. A mold assembly of opposite but identical design will result in a matching 45-degree plane that fits together with it's opposite twin in a 90-degree concrete corner wall.

As seen in FIG. 4, insulation piece 44 is a triangular piece of insulation, that is placed in both the top and bottom beams of the form and which mimics the slope of insulation piece 38 to create the same 45-degree angle in both top and bottom beams. This 45 degree angle therefore remains consistent at the end of each corner, in the wall itself, and in the top and bottom beams. The consistent 45 degree angle enables two separate corner walls to fit together at a 90-degree angle and create a foundation corner. This process of "mitering", that is matching two separate panels each with a 45 degree angle to join together in a 90 degree corner side, is common in areas of construction such as door and window framing, but until now has not been used in concrete wall construction. The above described insulation mold assembly enables the foundation to be mitered together in concrete at a 90 degree angle to form a foundation corner.

By locating the "H" piece, which creates a load bearing concrete stud adjacent to insulation pieces 44 and 40 and partially underneath insulation piece 42, the corner element is integrated into the overall wall structure, and in the preferred embodiment of the invention the concrete studs are located 11 inches from wall corner ends. These concrete studs 35 in FIGS. 6, 7 are thus located each at a 90-degree angle and directly adjacent to the other, and thereby enable a structural design on the interior of the wall corners onto which finishing material can be attached.

FIG. 5 shows a corner assembly bounded by side rails showing placement of the pieces necessary to mold a wall corner; and the cavities necessary to form concrete beams and studs. The vertical concrete studs 35 in FIGS. 6, 7, and 8 are reinforced with steel rod (rebar) 37 (shown in FIGS. 2 and 6) and the stud cavities flow directly into and connect with cavities for the top and bottom beams 33 of the wall which function as the corollary to a wooden framed wall "top plate" and "bottom plate" but are made of reinforced concrete. Furring strips 22 are also shown in FIGS. 7 and 8. The studs 35, top and bottom beams 33, and outer shell wall 50 are a single poured concrete monolithic structure.

FIG. 6 shows a partial section of a finished wall in cross-section. The stud 35 is reinforced with rebar 37. The stud 35 is formed as a uniform part of the outer shell wall 50. Insulation pieces 36 and 32 remain in place in finished form, along with H-piece 10, which encompasses, surrounds, and covers the stud 35. Furring or attachment strip 22 is held in place via fasteners 24 that pass through the H-piece 10 and are anchored into the stud 35.

FIG. 7 shows how the present invention enables interior finish material such as wallboard to be affixed in the corner. FIG. 7 shows a piece of wallboard 39 in place attached to the furring strips, where cutaway line 39A reveals the concrete studs 35 and furring strips 22 beneath the wallboard 39. The same FIG. 7 also shows the corner condition where the wallboard 39 is attached on one of the perpendicular walls and not attached on the other, where a furring strip 22 is visible. The furring strips 22 are shown as attached on the other studs not covered by wallboard in the drawing.

Also shown are the top and bottom reinforced concrete beams 33, preferably 4 inches thick in the preferred embodiment of the invention, and formed by maintaining a four-inch distance between the bounding side rails of the form and the arrangement of the insulation pieces at the top and bottom of the form.

Figure 9:
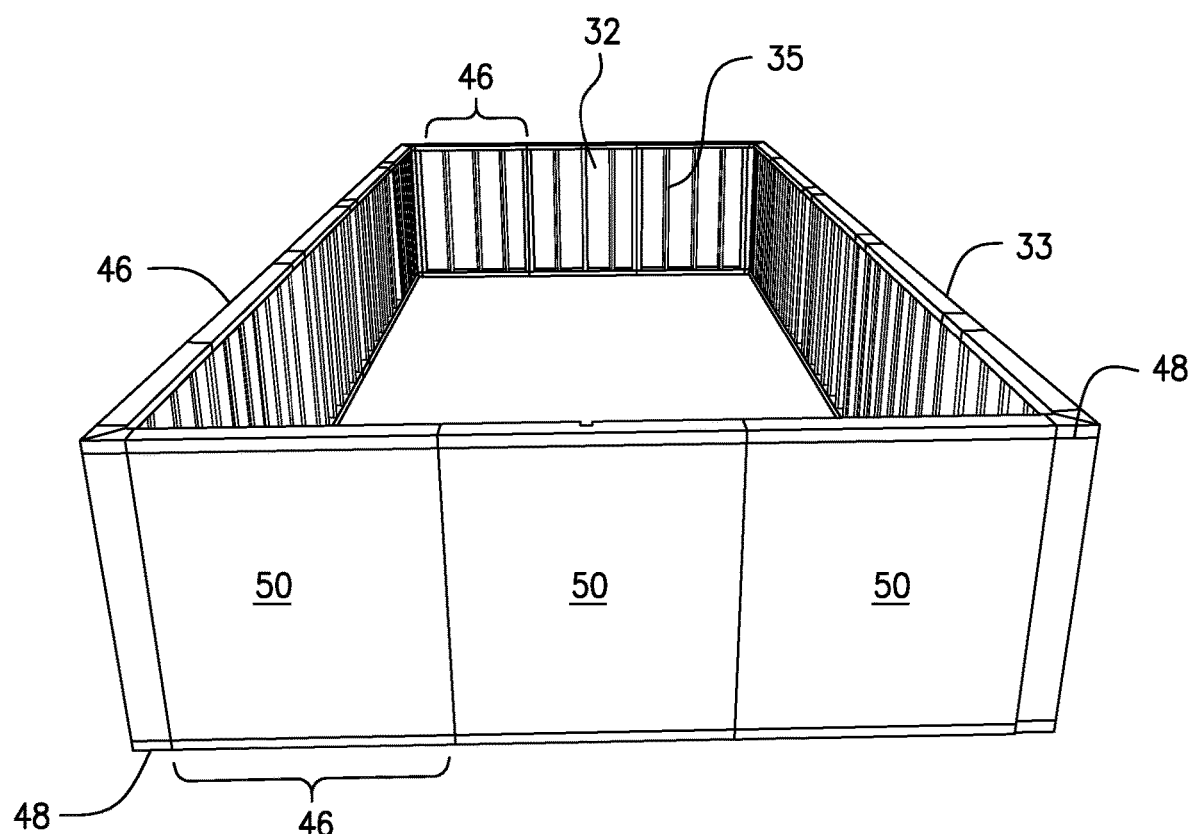
FIG. 9 is a perspective view of an assembled basement foundation.

FIG. 9 shows a foundation unified from precast concrete panels with a combination of straight walls 46 and walls containing corner elements 48 which are arranged to form a rectangular building foundation consisting of straight wall panels and corner wall panels. The concrete outer wall shell 50 can be seen, which all the panels are set in place, combine to form a uniform flat perimeter outer wall. Thus the present invention allows for the building of individual walls and wall foundation system created solely by an insulation mold design comprised of specific shapes and dimensions to enable a union of straight and corner walls structurally attached together to form a building foundation.

Straight wall panels are fastened together using threaded steel connection rods and hex nuts which fasten abutting walls together by joining adjacent wall end studs with one another using 3 points of connection (matching one inch diameter holes in the top, middle, bottom of each stud) cast (or drilled, but casting is preferred) into each stud at the same heights so that the three quarter inch steel connection rods may be passed through the holes and the walls tightened together by tightening the hex nuts.

Corner walls are fastened together by drilling, from outside in, through the mitered concrete corners of both adjoining panels to penetrate the wall corner and then through to the wall stud of the perpendicular adjoining wall and, in the preferred embodiment of the invention, passing a quarter inch threaded steel rod through the openings to be tightened together using hex nuts.

In this way, the fastening of the corners and straight walls together with the assembly of the panels into a rectangular form stabilizes the entirety of the foundation structure into a self-supporting whole, and a structural pre-cast concrete wall system is created.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated.

What is claimed is:

1. A wall structure comprising:
    a concrete base beam located in an essentially horizontal plane;
    a concrete top beam, located in an essentially horizontal plane;
    two or more concrete vertical support members integrally joined to the base beam and the top beam and meeting said beams at an essentially right angle;
    wherein said two or more vertical support members define a left wall boundary and a right wall boundary, and wherein said top beam and said base beam define a top wall boundary and a bottom wall boundary, respectively;
    an exterior wall shell extending from said left wall boundary to said right wall boundary, and extending from said top wall boundary to said bottom wall boundary, and continuous with said base beam, said top beam, and said support members;
    H-shaped insulation encompassing and attached to said vertical support members with attachment strips attached to said H-shaped insulation running along its length and having one or more fasteners joining the attachment strip to the vertical support member, wherein said fastener passes though said H-shaped insulation, and
    rigid insulation attached to the exterior wall shell and positioned between said vertical support members.

2. The wall structure of claim 1 wherein said rigid insulation is attached to an interior surface of the exterior wall shell.

3. The wall structure of claim 1 wherein at least one of said leftmost and rightmost members has a mitered lengthwise edge.

4. The wall structure of claim 1, wherein said rigid insulation comprises a plurality of sheets of insulation.

5. The wall structure of claim 4, wherein at least one of said sheets of rigid insulation is extruded polystyrene.

6. The wall structure of claim 4, wherein at least one of said sheets of rigid insulation is expanded polystyrene.

* * * * *